United States Patent
Laliberte

(10) Patent No.: US 9,388,061 B2
(45) Date of Patent: Jul. 12, 2016

(54) METALLOID CONTAMINATED WATER SOLUTION PURIFICATION PROCESS FOR SAFE HUMAN CONSUMPTION-RATED REDUCTION OF CONTAMINANT CONCENTRATION THEREIN, BY PRECIPITATION WITHOUT OXIDATION

(71) Applicant: Veolia Water Solutions & Technologies Support, Saint-Maurice (FR)

(72) Inventor: Marc Laliberte, LaSalle (CA)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 37 days.

(21) Appl. No.: 14/412,300

(22) PCT Filed: Jun. 26, 2013

(86) PCT No.: PCT/CA2013/000603
§ 371 (c)(1),
(2) Date: Dec. 31, 2014

(87) PCT Pub. No.: WO2014/005216
PCT Pub. Date: Jan. 9, 2014

(65) Prior Publication Data
US 2015/0183667 A1    Jul. 2, 2015

Related U.S. Application Data

(60) Provisional application No. 61/667,706, filed on Jul. 3, 2012.

(51) Int. Cl.
*C02F 1/52* (2006.01)
*C02F 101/20* (2006.01)
*C02F 1/56* (2006.01)
*C02F 101/10* (2006.01)

(52) U.S. Cl.
CPC .............. *C02F 1/5245* (2013.01); *C02F 1/5236* (2013.01); *C02F 1/56* (2013.01); *C02F 2101/103* (2013.01); *C02F 2101/203* (2013.01); *C02F 2209/06* (2013.01); *C02F 2301/08* (2013.01)

(58) Field of Classification Search
None
See application file for complete search history.

(56) References Cited

U.S. PATENT DOCUMENTS

| | | | |
|---|---|---|---|
| 4,515,696 A | 5/1985 | Matthew et al. | |
| 5,378,366 A | 1/1995 | Yen | |
| 5,651,895 A | 7/1997 | Gordon | |
| 5,871,648 A | 2/1999 | Allen et al. | |
| 6,461,535 B1 * | 10/2002 | de Esparza ............ | C02F 1/5236 210/667 |
| 7,615,199 B2 | 11/2009 | Poijarvi et al. | |
| 7,892,436 B2 | 2/2011 | Gadgil | |
| 2003/0010720 A1 | 1/2003 | Chwirka | |
| 2007/0209989 A1 | 9/2007 | Hayashi et al. | |
| 2011/0094969 A1 | 4/2011 | Misra et al. | |

FOREIGN PATENT DOCUMENTS

| | | |
|---|---|---|
| EP | 0156059 A2 | 10/1985 |
| EP | 0764042 B1 | 3/1997 |
| EP | 1878703 A1 | 1/2008 |
| EP | 2248768 B1 | 11/2010 |
| GB | 1502775 A | 3/1978 |
| WO | 03002462 A1 | 1/2003 |
| WO | 2007019588 A1 | 2/2007 |
| WO | 2008092724 A1 | 8/2008 |
| WO | 2010043473 A1 | 4/2010 |
| WO | 2011005794 A1 | 1/2011 |
| WO | 2012106181 A2 | 8/2012 |

* cited by examiner

*Primary Examiner* — Chester Barry
(74) *Attorney, Agent, or Firm* — Fraser Clemens Martin & Miller LLC; James D. Miller

(57) ABSTRACT

A metalloid contaminated liquid water solution purification process providing decrease to safe human consumption-rated levels of metalloid concentration therein, by precipitation without oxidation and without liquid water heating. The process comprises the following steps: injecting a ferric iron coagulant; injection of lime in the liquid solution; precipitating the metalloid; separating the resulting slurry between a liquid and a solid phase, wherein a clarified water solution is obtained; wherein the liquid phase of the solution is economically reclaimed, while the solid phase slurry is disposed of.

14 Claims, No Drawings

METALLOID CONTAMINATED WATER SOLUTION PURIFICATION PROCESS FOR SAFE HUMAN CONSUMPTION-RATED REDUCTION OF CONTAMINANT CONCENTRATION THEREIN, BY PRECIPITATION WITHOUT OXIDATION

CROSS-REFERENCE DATA

This application is a United States national phase application based on PCT/CA2013/000603 filed on Jun. 26, 2013, which claims the benefit of U.S. Provisional Application Ser. No. 61/667,706 filed on Jul. 3, 2012, the entire disclosures of which are hereby incorporated herein by reference.

BACKGROUND OF THE INVENTION

Water management is routinely listed as one of the top global challenges facing mine development, production, and closure. Successful mine water management can mean the difference between operating at a profit or loss. This approach benefits the mine operations by lowering costs and effectively managing water quantity and quality while controlling adverse hydrological impacts. Moreover, government environmental agencies throughout the world are continuously moving to impose progressively more challenging minimum standards for water quality in mine water effluent discharge, in view of protecting fish and fresh water plants, as well as humans (drinking water).

The principal waste-waters associated with mines and quarries are slurries of rock particles in water. These arise from rainfall washing exposed surfaces and haul roads and also from rock washing and grading processes, and also from seepage. Volumes of water can be very high, especially rainfall related arising on large sites. Some specialized separation operations, such as coal washing to separate coal from native rock using density gradients, can produce wastewater contaminated by fine particulate haematite and surfactants. Oils and hydraulic oils are also common contaminants. Wastewater from metal mines and ore recovery plants are inevitably contaminated by the minerals present in the native rock formations. Following crushing and extraction of the desirable materials, undesirable materials may become contaminated in the wastewater. For metal mines, this can include unwanted metals such as zinc and other materials such as arsenic. Extraction of high value metals such as gold and silver may generate slimes containing very fine particles where physical removal of contaminants becomes particularly difficult.

Arsenic is a chemical element (symbol As), atomic number 33 and relative atomic mass 74.92. Arsenic is a naturally occurring contaminant found in many ground waters. It generally occurs in two forms (valence or oxidation states): pentavalent arsenic (arsenate) and trivalent arsenic (arsenite). In natural ground water, arsenic may exist as trivalent arsenic, pentavalent arsenic, or a combination of both. Although both forms of arsenic are potentially harmful to human health, trivalent arsenic is considered more harmful than pentavalent arsenic. Moreover, trivalent arsenic is generally more difficult technically to remove from drinking water than pentavalent arsenic. That is why an efficient method for arsenite removal from contaminated water solution is still not available.

Arsenate is a salt or ester of arsenic acid. Natural arsenite minerals are very rare oxygen bearing arsenic minerals, but may be synthesized in industrial plants.

Arsenic is a metalloid. The main use of metallic arsenic is for strengthening alloys of copper and especially lead (for example, in car batteries). Arsenic is also common in semi-conductor electronic devices and in the production of pesticides, herbicides and insecticides. Arsenic is highly toxic and very poisonous to multicellular life, including humans, by blocking the Krebs cycle essential to cellular metabolism which results in loss of ATP. In particular, arsenic contamination of groundwater is a public health issue that affects millions of people across the world.

In water contaminated streams in the wild, both arsenite and arsenate forms of arsenic will be found, dynamically interacting with each other, with relative concentration balance of one or the other shifting according to various parameters including electromagnetic radiations (e.g. ultraviolet sun radiations) and biological elements (e.g. bacteria). Some bacteria obtain their energy by oxidizing various fuels while reducing arsenates to form arsenites, while other bacteria will oxidize arsenites to form arsenates via photosynthesis.

A one-step process involving lime can be used for purification of a water source contaminated with arsenic. However, this water purification process does not meet newer arsenic discharge limits.

It is possible to remove arsenic by oxidation with the addition of an oxidizing agent such as for example potassium permanganate, molecular oxygen, chlorine, calcium hypochlorite and ferric iron. These processes can use either one or two steps and will reduce arsenic concentrations, but are costly to operate because of the oxidation requirements, and may be hazardous to mammals with some of these components being recognized as carcinogenic compounds, and thus undesirable for potable water treatment. Such oxidizer based water purification methods will also require relatively high liquid water solution temperatures, for example between 40° and 70° Celsius, and will become inoperative in cold and particularly in very cold temperatures found in cold stream waters for example in Canada and Chile. High operating temperatures will have a detrimental environmental impact over and above the economic cost, since water to be treated will have to be previously warmed up.

Moreover, if ammonia is present in the raw (untreated) water solution, as is often the case with industrial effluents, oxidizers may generate toxic by-products such as trichloromethane (chloroform) and chloramines, which are toxic to mammals.

Also, it is possible, after oxidation, to absorb arsenic on solid media such as for example clay, granular ferric hydroxide, colloids, alumina and activated silica. However, such absorption will require a lot of absorption media and will generate a large amount of toxic solid wastes, wherein their disposal will become a major economic drain in large scale industrial plants, particularly for arsenic. The media life will be too short.

In contaminated water solutions, it is possible for pentavalent arsenic (arsenate) to be removed by coagulation with ferric chloride and with a softening process using lime. However, such coagulation does not remove trivalent arsenic (arsenite) as efficiently as in the case of arsenate.

SUMMARY OF THE INVENTION

The present invention relates to a metalloid contaminated liquid water solution purification process providing decrease to safe human consumption-rated levels of metalloid concentration therein, by precipitation without oxidation and without liquid water heating. The process comprises the following steps: a) injecting a ferric iron coagulant; b) injection of lime in the liquid solution; c) precipitating the metalloid; and d) separating the resulting slurry between a liquid and a solid phase, wherein a clarified water solution is obtained; wherein the liquid phase of the solution is economically reclaimed, while the solid phase slurry is disposed of.

The present water purification process will work well in water temperatures of less than 50° C., and in particular, of less than 15° C., and more particularly, at about 3° C.

In one embodiment, there is further included a step cc) of adding a polymer, between said steps c) and d).

In one embodiment, there is further included a step e) of adding another dose of said ferric iron coagulant and of polymer, after said step d).

A step f) of further injection of lime in the liquid solution, after said step e), could be added.

A step g) of precipitating the metalloid, after said step f, could be added.

In one embodiment, there is provided a step h) of separating the resulting slurry between a liquid and a solid phase, after said step g), wherein a clarified water solution is obtained, while the further solid phase slurry is disposed of.

Said separation of resulting slurry in said steps d) and h) could be performed through means selected from the group comprising settling, centrifugation, and filtration means.

In one embodiment, said metalloid could consist of arsenic, or alternately of selenium.

In the case of arsenic, the pH in said step b) could be brought by said lime injection to a range between 8 to 11. More particularly, the pH in said step b) could also be brought by said lime injection to a range between 9 and 10. In said step f), the pH could be adjusted by said lime injection to a range between 6.5 to 9. More particularly, in said step f), the pH could be adjusted by said lime injection to a range between 7 and 8.5. In said step a), a dosage in the range between 1 to 3 parts by weight of iron per part of said arsenic could be achieved during the addition of ferric iron coagulant. More particularly, in said step a), a dosage of 2 parts by weight of iron per part of said arsenic could achieved during the addition of ferric iron coagulant. In said step e), a dosage in the range of 4 to 25 parts per weight of iron per part of the remaining said arsenic is achieved during the addition of ferric iron coagulant. More particularly, in said step e), a dosage of 10 parts per weight of iron per part of remaining said arsenic is achieved during the addition of ferric iron coagulant.

In the case of selenium, the pH in said step b) could be brought by said lime injection to a range between 4 to 8, and more particularly between 5 and 7. In said step f), the pH could be adjusted by said lime injection to a range between 5 to 8, and more particularly between 5.5 and 7. A dosage in the range between 10 to 200 parts by weight, and in particular between 50 to 100 parts by weight of iron per part of said selenium could be achieved during the addition of ferric iron coagulant in said step a). In said step e), a dosage in the range of 4 to 25 parts per weight, and in particular of 10 parts per weight of iron per part of remaining said selenium could be achieved. A further step e) of adding another dose of said ferric iron coagulant and of polymer, after said step d), could be provided; wherein said ferric iron coagulant is selected from the group comprising ferric chloride, ferric sulphate, and ferric nitrate.

DETAILED DESCRIPTION OF THE INVENTION

The present water purification process combines the low operating cost of a lime based purification process with the arsenic discharge limits of an oxidation process, all with the capability to work efficiently in cold and very cold contaminated liquid water streams, without oxidizing agent. The present invention is generally directed at a method to precipitate (instead of absorb) arsenic in water and wastewater, not excluding selenium, antimony, molybdenum, or other metalloids. Specifically, the present water purification process will be operative with trivalent arsenic (arsenite) as well as with pentavalent arsenic (arsenate), without the addition of an oxidizer; and furthermore, will be operational in all the liquid water temperature range, including cold water close to freezing point, in particular at temperatures at maximum water density, for example at about 3° C.

The present water purification process will address current deficiencies in water treatment of large scale industrial plants generating synthetic arsenite discharged into the environment. The present process will be operational even with very high arsenic concentration in the water solution, and whether the arsenic is present as a solid or a dissolved species. In particular, this process will be fully operational whether the arsenic contaminating the water solution is present specifically as arsenite, as arsenate, or as a mixture of arsenite and arsenate.

In one embodiment, the present method consists of the following steps:

a) rough removal
   addition of a ferric iron coagulant, e.g. ferric chloride or ferric sulphate, for example with a dosage of 2 parts of iron per part of arsenic (by weight) being optimal, with a larger operational range of 1 to 3 parts of iron per part of arsenic by weight.
   addition of lime to adjust the pH to an optimal range of 9 to 10, with an operational range between 8 to 11;
   solid-liquid separation, for example with a sand-ballasted clarifier;
   sending for polishing the liquid phase arsenic concentration while disposing of the solid waste phase.

b) polishing
   addition of a ferric iron coagulant, for example ferric chloride or ferric sulphate, with a dosage of for example 10 parts of iron per part of arsenic by weight being optimal, with a larger operational range between 4 to 25;
   addition of an acid or a base to adjust the pH to an optimal range between 7 and 8.5 (with 6.5 to 9 remaining an operational range);
   solid-liquid separation, through use for example of a sand-ballasted clarifier.
   the liquid phase arsenic concentration can then be reduced to for example less than 10 micrograms per liter (µg/L), while the solid waste phase is sent for disposal.

In this latter embodiment, the arsenic concentration after this second polishing step will be limited only by the ferric iron dosage and by the efficiency of the solid-liquid separation step. The clarified water from the second step will now contains less than 100 µg/L of total arsenic. The concentration can be reduced further if required by increasing the dosage of ferric coagulant in the first and second steps, and applicant has demonstrated that less than 10 µg/L can be achieved. The lower limit that can be achieved without some filtration polishing is expected to be on sound prediction basis in the vicinity of 1µ/L, based on the efficiency of sand-ballasted settlers.

The present arsenic precipitation process will generate an amount of solid waste products that will be considerably smaller, for example between one to two orders of magnitude less, compared to the amount of solid wastes generated through arsenic absorption based water solution treatment methods.

The present invention is characterized in being a two step process, with no oxidation required, the first step at highly alkaline pH with lime and ferric iron addition, and the second step at neutral or slightly alkaline pH with ferric iron addition. The operating costs of this water purification process becomes substantially lower than that of the conventional oxidation based process.

By way of example only, the present arsenic-removing water purification process could in one embodiment of the present invention be integrated into the water purification process clarifiers disclosed in applicant's own U.S. Pat. No. 8,157,988 issued Apr. 17, 2012, wherein the efficiency of this patented process would be demonstrated to at least meet or even exceed the minimum discharge criteria for arsenic.

Applicant has conducted laboratory work testing, to compare four methods for removing metalloid contaminants from an alkaline water solution with lime precipitation: one with arsenic, one with arsenite, one with arsenate, and a fourth one with selenium. These four methods are completely different from conventional metalloid removal methods, which typically use oxidation.

The following examples illustrate the advantages of the process. Four examples will be given, one mine water sample containing a mix of arsenite and arsenate, one with a synthetic sample of similar composition except that all the arsenic is present as arsenite, one with another synthetic water but with all the arsenic present as arsenate, and finally one with the arsenic replaced by selenium.

All tests were done at controlled temperature. All analysis were done in an external lab and certified by a chemist. The analyses were done by ICP-MS. For arsenic the method used was EPA's "SW-846 6020" and the detection limit was 2 µg/L. For selenium the method used was Quebec's "MA 200-Mét. 1.2" and the detection limit was 1 µg/L.

The selenium used in example 4 was from sodium selenite. The polymer used in all examples was a dry anionic polymer (Hydrex 6105). The coagulant used in all examples was a ferric sulfate solution containing 12.2% iron by weight (Hydrex 3253).

| Reference | Example 1 Actual mine water from NWT, Canada | Example 2 Synthetic water with arsenite only | Example 3 Synthetic water with arsenate only | Example 4 Synthetic water with selenium |
|---|---|---|---|---|
| Initial parameters | | | | |
| pH | 7.9 | 7.8 | 7.8 | 7.5 |
| Sodium (dissolved, mg/L) | 113 | 287 | 186 | 190 |
| Calcium (dissolved, mg/L) | 232 | 240 | 240 | 240 |
| Magnesium (dissolved, mg/L) | 66.9 | 70 | 70 | 70 |
| Chloride (dissolved, mg/L) | 233 | 230 | 230 | 230 |
| Sulphate (dissolved, mg/L) | 582 | 277 | 277 | 280 |
| Arsenic (dissolved, µg/L) | 63000 | 60000 | 60000 | 0 |
| Selenium (dissolved, µg/L) | <1 | 0 | 0 | 561 |
| Temperature (° C.) | 3 | 3 | 3 | 22 |
| Process | | | | |
| Injection of ferric coagulant (step a, as mg Fe/L) | 76 | 151 | 76 | 151 |
| Injection of lime (step b, as mg Ca(OH)2/L) | 400 | 400 | 200 | 250 |
| Injection of polymer (step cc, as mg/L) | 2 | 1 | 1 | 2 |
| Remaining metalloid in clarified water after step d (dissolved, µg/L) | 1420 | 761 | 404 | 11 |
| Injection of ferric coagulant (step e, as mg Fe/L) | 19 | 19 | 19 | 19 |
| Injection of lime (step f, as mg Ca(OH)2/L) | 0 | 40 | 0 | 30 |
| Injection of polymer (mg/L) | 1 | 1 | 1 | 2 |
| Remaining metalloid in clarified water after step h (dissolved, µg/L) | 22 | 41 | 5 | 3 |

As can be seen in the results appearing in applicant's hereinabove four tests table, the first test was performed from the actual water solution output generated from a mining operation in North West Territories, Canada, the water solution having a concentration of 63,000 µg/L of dissolved arsenic, cold liquid water temperature of 3° Celsius (C) and pH level of 7.9. The results are shown as Example 1.

The second test was performed on a synthetic water solution with 60,000 µg/L of dissolved arsenic, cold liquid water temperature of 3° C. and pH level of 7.8. The results are shown as Example 2.

The third test was performed on a synthetic water solution with 60,000 µg/L of dissolved arsenate, cold liquid water temperature of 3° C. and pH level of 7.8. The results are shown as Example 3.

The fourth and last test was performed on a synthetic water solution with 561 µg/L of dissolved selenium, ambient liquid water temperature of 22° C. and pH level of 7.5. The results are shown as Example 4.

In each of the above-noted four lab tests, anionic polymer is added in each of the two steps thereof of the present water solution purification process, to improve turbidity and arsenic removal.

A lower level of toxic metalloid water solution contaminant, such arsenic, arsenite, arsenate and selenium, is better and safer.

As shown in the results of the Examples 1 to 4, the metalloid concentration is reduced in two steps:
1) At intermediate step d) of the present metalloid purification method, the arsenic in the actual mine water solution decreases in the partially clarified water from 63,000 to 1,420 µg/L, thus between one and two orders of magnitude decrease; the arsenite in example 2 decreases from 60,000 to 761 µg/L, thus about two orders of magnitude decrease; the arsenate in example 3 decreases from 60,000 to 404 µg/L, that is by more than two orders of magnitude decrease; and for the selenium, the concentration decreases from 561 to 11, thus between one and two orders of magnitude decrease in contaminant level.
2) At final step h) of the present metalloid purification method, the arsenic in the actual mine water solution decreases in the more thoroughly clarified water from 63,000 to 22 µg/L, thus more than three orders of total magnitude decrease; the arsenite in example 2 decreases from 60,000 to 41 µg/L, thus more than two orders of total magnitude decrease; the arsenate in example 3 decreases from 60,000 to 5 µg/L, here about four orders of total magnitude decrease; and for the selenium, the concentration decreases from 561 to 3, thus more than two orders of total magnitude decrease in contaminant level.

It is noted that in Examples 1 and 3, no second injection of lime is performed during the second step at step f), whereas lime is injected in the two remaining experiments of Examples 2 and 4 as 40 mg Ca(OH)2/L and 30 mg Ca(OH)2/L, respectively.

Current Canadian government standards for allowable arsenic contamination in water is 200 µg/L or less, for Quebec's Directive 019 standard; 100 µg/L or less, for Ontario's PWQO standard; and down to 5 µg/L or less for the Canadian Council of Ministers for the Environment (CCME) standard. CCME is a forum for members to develop national strategies, norms, and guidelines that each environment ministry across Canada can use. It is noted that all four tests do meet the current purification standards in the two Canadian provinces of Quebec and Ontario. When the tests for examples 1, 2 and 3 were conducted, we were targeting an arsenic concentration of less than 100 µg/L. The arsenic concentration could have been decreased further by increasing the ferric iron dosage in step e).

This test program was designed to be incorporated into applicant's sand-ballasted flocculation technology patented as U.S. Pat. No. 8,157,988 issued Apr. 17, 2012. In order to properly simulate typical Canadian winter conditions, three of the four tests were performed at a cold liquid temperature of around 3° C. This explains why the present metalloid purification method, and in particular the arsenic, arsenite and arsenate purification method, is new and obviousness in view of the prior art because of its ability to perform at liquid temperature of maximum density found year long (i.e. including summers and winter) in the majority of the water volume of Canadian lakes below the thermocline threshold.

It is noted that water solution purification processes that work at ambient room temperature do not necessarily work at near freezing temperatures such as 3 or 4° C.; however, a liquid water solution purification process that works well under near freezing conditions will also usually work in warmer water with reduced chemical dosage requirements.

Cost savings of close to 40% with the present lime precipitation arsenic contaminated water solution purification method have been calculated, compared with conventional oxidation based purification methods. For example, in a conventional oxidation based purification method, a total cost in chemical compounds for treatment per 1,000 cubic meters was found to be 1,574 $, whereas with the present invention, the total cost was reduced to 974 $.

In conclusion, the present purification process has disclosed that arsenic can be consistently removed from a typical mine water effluent using a two step treatment chain with clarifiers, for example with the clarifiers disclosed in applicant's U.S. Pat. No. 8,157,988 issued Apr. 17, 2012. The present arsenic purification process in water has significantly lower operating costs, and will perform well in particular in water close to freezing levels.

I claim:

1. An arsenic contaminated liquid water solution purification process for temperature environments of a liquid water solution of less than 15° C., providing decrease to safe human consumption-rated levels of arsenic concentration therein, by precipitation without arsenic oxidation, the purification process comprising the following steps:
   a) providing the liquid water solution containing arsenic, the arsenic having a first concentration value level;
   b) injecting a first dose of ferric iron coagulant without an oxidizing agent;
   c) injecting lime in the liquid water solution without an oxidizing agent, wherein a precipitating arsenic precipitates without arsenic oxidation;
   d) separating a resulting slurry between a liquid and a solid phase, wherein a first clarified water solution is obtained;
   e) adding a second dose of ferric iron coagulant to the first clarified water solution without an oxidizing agent;
   f) further injecting lime in the liquid water solution without an oxidizing agent, wherein the precipitating arsenic again precipitates without arsenic oxidation; and
   g) separating a resulting slurry between a liquid and a further solid phase, wherein a second clarified water solution is obtained, while the further solid phase slurry is disposed of;
   wherein a second concentration value level of arsenic is achieved, the second concentration value level of arsenic constituting a decrease by at least more than two orders of magnitude of arsenic concentration level relative to the first concentration value level of arsenic in the liquid water solution.

2. The purification process of claim 1, further comprising a step of adding a polymer between steps c) and d) to improve turbidity and arsenic removal.

3. The purification process of claim 2, further comprising a step of adding a polymer between steps f) and g) to improve turbidity and arsenic removal.

4. The purification process of claim 3, wherein a temperature of the liquid water solution is less than 10° C.

5. The purification process of claim 4, wherein the temperature of the water solution is 3° C., the first concentration value level of arsenic is 63 mg per liter of the liquid water solution, and the second concentration value level of arsenic is 0.02 mg per liter of the liquid water solution.

6. The purification process of claim 1, wherein the separating the resulting slurry steps d) and g) are performed through means selected from the group comprising settling, centrifugation, and filtration.

7. The purification process of claim 1, wherein a pH of the liquid water solution is adjusted by the injecting lime step in step c) to a range between 8 and 11.

8. The purification process of claim 7, wherein the pH is adjusted by the injecting lime step in step c) to a range between 9 and 10.

9. The purification process of claim 1, wherein a pH of the liquid water solution is adjusted by the injecting the lime step in step f) to a range between 6.5 and 9.

10. The purification process of claim 9, wherein the pH is adjusted by the injecting the lime step in step f) to a range between 7 and 8.5.

11. The purification process of claim 1, wherein a dosage in a range of 1 to 3 parts by weight of iron per part of the arsenic is achieved by the injecting the first dose of ferric iron coagulant in step b).

12. The purification process of claim 11, wherein a dosage of 2 parts by weight of iron per part of the arsenic is achieved by the injecting the first dose of ferric iron coagulant in step b).

13. The purification process of claim 1, wherein a dosage in the range of 4 to 25 parts per weight of iron per part of the arsenic remaining is achieved by the adding the second dose of ferric iron coagulant to the first clarified water solution in step e).

14. The purification process of claim 13, wherein a dosage of 10 parts per weight of iron per part of the arsenic remaining is achieved by the adding the second dose of ferric iron coagulant to the first clarified water solution in step e).

* * * * *